United States Patent
Bailey et al.

(10) Patent No.: US 6,782,310 B2
(45) Date of Patent: Aug. 24, 2004

(54) WIRELESS IRRIGATION CONTROL DEVICE AND RELATED METHOD

(75) Inventors: David Franklin Bailey, Riverview, FL (US); Ronald Willard Mickels, Chulsa Vista, CA (US); Mark Murphy Ensworth, Orange, CA (US); Leon Paul Kass, Apollo Beach, FL (US)

(73) Assignee: Rain Bird Corporation, Glendora, CA (US)

( * ) Notice: Subject to any disclaimer, the term of this patent is extended or adjusted under 35 U.S.C. 154(b) by 0 days.

(21) Appl. No.: 10/029,726

(22) Filed: Dec. 20, 2001

(65) Prior Publication Data

US 2003/0120393 A1 Jun. 26, 2003

(51) Int. Cl.$^7$ .................................................. G05D 7/00
(52) U.S. Cl. ........................................................ 700/284
(58) Field of Search .................... 700/284, 16; 340/539, 340/3.1; 361/179; 307/116; 137/624.11; 405/37

(56) References Cited

U.S. PATENT DOCUMENTS

| | | | | |
|---|---|---|---|---|
| 4,423,484 A | * | 12/1983 | Hamilton | 700/284 |
| 4,626,984 A | * | 12/1986 | Unruh et al. | 700/3 |
| 4,838,310 A | * | 6/1989 | Scott et al. | 137/624.14 |
| 5,173,855 A | * | 12/1992 | Nielsen et al. | 700/284 |
| 5,206,857 A | * | 4/1993 | Farleigh | 370/452 |
| 5,621,730 A | * | 4/1997 | Kelley | 370/345 |
| 5,748,466 A | * | 5/1998 | McGivern et al. | 700/17 |
| 5,921,280 A | * | 7/1999 | Ericksen et al. | 137/624.11 |
| 6,088,621 A | * | 7/2000 | Woytowitz et al. | 700/16 |
| 6,236,332 B1 | * | 5/2001 | Conkright et al. | 340/3.1 |
| 6,335,855 B1 | * | 1/2002 | Alexanian et al. | 361/179 |
| 2002/0105437 A1 | * | 8/2002 | Pollak et al. | 340/870.28 |
| 2003/0067889 A1 | * | 4/2003 | Petite | 370/310 |

* cited by examiner

*Primary Examiner*—Leo Picard
*Assistant Examiner*—Alexander Kosowski
(74) *Attorney, Agent, or Firm*—Fitch, Even, Tabin & Flannery

(57) ABSTRACT

An irrigation control device (12) with a controller (14), antenna (16), power supply (70) and battery charging device (72), such as a solar array, all contained within a housing, such as a rotor body (90). The controller (14) receives signals through the antenna (16). The controller (14) updates one or more watering schedules stored in a memory module (32), based on the received signals, and generates control signals to execute a watering schedule. The battery charging device (72) recharges the power supply (70) and the irrigation control device requires no external electrical connections for power or control. Control signals are generated in a central controller (18) remote from the rotor (12), and are preferably transmitted to the rotor antenna (16) through a commercial paging or other type of public broadcast network (20, 22, 24).

46 Claims, 7 Drawing Sheets

WIRELESS IRRIGATION CONTROL DEVICE AND RELATED METHOD

BACKGROUND OF THE INVENTION

This invention relates generally to automated irrigation systems and, more particularly, to systems for the control of irrigation devices, such as valves, pumps and rotors. Water valves and pumps are used to control the flow of irrigation water through a variety of water dispensing devices, including rotors. Rotors irrigate by throwing a jet or spray of water that is rotated about a generally vertical axis. Rotors are typically enclosed in a protective housing, and a rotating nozzle pops up from the top of the housing during desired irrigation times. Rotors are supplied with water from water supply lines that are usually installed below ground and are typically actuated by electric solenoid-controlled valves. Rotation of the nozzle may be effected by a self-contained water turbine and a reduction gear mechanism, or the nozzle may be of the impact-arm type, which utilizes the angular momentum of a spring-loaded oscillating arm to rotate the nozzle in small angular increments through a desired arc, or continuously through a full circle of rotation.

Valves, pumps and rotors are used in a wide variety of irrigation applications, from residential and commercial landscapes to golf course and agricultural irrigation. The application to golf course irrigation is mentioned here by way of example, but as the description of the invention proceeds it will be understood that the principles described are equally applicable to other types irrigation environments. A common feature of underground irrigation systems is that control wires must be run from a controller to each solenoid valve and pump that controls the flow of water to a sprinkler or group of sprinklers. Control wires to the valves, pumps and rotors are typically buried below ground, often in the same trenches used to run supply pipes to the valves. Control systems vary from simple multi-station timers to complex computer-based controllers.

The advantages of a wireless rotor, using a battery to control the solenoid valve, have been recognized by others. For example, U.S. Pat. No. 4,626,984 to Unruh, U.S. Pat. No. 5,813,655 to Pinchott et al., and U.S. Pat. No. 4,962,522 to Marian, broadly suggest some features of a wireless rotor. None of these patents, however, suggest all of the features of the present invention, which are summarized below.

BRIEF SUMMARY OF THE INVENTION

The present invention resides in a wireless irrigation control device. Briefly, and in general terms, the wireless irrigation control device of the invention comprises a water control device, which may be a rotor, a valve or a pump, and a controller coupled to the water flow control device. The controller includes a housing, an antenna integrated into the housing and capable of receiving radio-frequency (RF) signals, a microcontroller contained within the housing and coupled to receive and process signals from the antenna, and a memory module for storing watering schedules established or modified by signals received through the antenna. The wireless irrigation control device also includes a battery power supply also contained within the housing, to supply power to the microcontroller and to the water control device. Preferably, the wireless irrigation control device further comprises a battery charge generator integrated into the controller housing and coupled to the battery power supply. The battery charge generator may be a solar panel, a water turbine or any other device for recharging the battery power supply.

Another aspect of the invention includes a magnetic proximity switch installed in the controller housing and coupled to the microcontroller. The magnetic proximity switch is configured to perform a function such as resetting the microcontroller, initiating a desired irrigation program sequence, or initiating a secured irrigation program sequence to allow system initialization.

Preferably, the controller has RF reception capability to process both short-range signals transmitted from a location near the irrigation control device and longer-range signals transmitted through a public broadcast system. The controller may receive short-range and longer-range RF signals through separate receivers operating in parallel at different frequencies, or may receive short-range and longer-range RF signals through a single receiver employing time-division multiplexing.

In accordance with another aspect of the invention, the microcontroller includes means for processing received signals indicative of real-time control commands directed to the water flow control device. These control commands may be signals for scheduling ON and OFF times for the water flow control device, or for setting a real-time clock based on the received signals, such as for making an adjustment for latency of transmission through a public broadcasting system. The means for processing received signals may also include means for adjusting irrigation control commands and sequences for the water flow control device.

In accordance with another aspect of the invention, the wireless irrigation control device further includes a visual status indicator coupled to the controller and integrated into the housing. The visual status indicator is indicative of conditions such as battery condition, receipt of a control signal by the antenna, or fault conditions detected in the controller.

The present invention may also be defined in terms of a method for controlling a wireless irrigation control device contained in a controller housing. Briefly, the method comprises the steps of receiving broadcast signals through an antenna installed in the housing; decoding the received broadcast signals and confirming that they apply to this particular irrigation control device; based on data received through the antenna from time to time, and decoded in the preceding step, storing and updating at least one watering schedule in a memory module; and based on the stored watering schedule, generating signals to control a water control device in accordance with the watering schedule. The step of generating signals to control a water control device may be directed to any suitable device, such as a rotor, a valve or a pump.

The method of the invention may further comprise recharging, as needed, a battery housed in the rotor body, using a battery charging generator integrated into the rotor body. The method of the invention may further comprise the step of configuring the controller by transmitting signals to it through a magnetic proximity switch, or configuring the controller by transmitting signals to it from a handheld transmitter.

The method of the invention may further include the step of verifying that command signals have been transmitted to the wireless irrigation control device by receiving the same signals in a verification receiver. After verifying transmission, the method may further include the steps of determining a transmission latency time from the verifying step, and transmitting a clock adjustment signal to the wireless irrigation control device, to compensate for the determined latency time.

The method of the invention may further comprise the step of displaying a condition of the controller in a display device associated with the controller. The displaying step may include displaying battery condition, displaying receiver status, or displaying a controller fault condition.

It will be appreciated from the foregoing summary that the present invention represents a significant advance in the field of irrigation control devices. In particular, the invention provides an irrigation control device that requires no outside electrical connections but is still controllable from a remote location. Because the controller, power supply, antenna and recharging generator are all integrated into a conventional rotor body or other housing, the invention may be readily implemented in new irrigation systems or retrofitted in existing ones that were originally hard-wired to a central controller. Other aspects and advantages of the invention will become apparent from the following more detailed description, taken in conjunction with the accompanying drawings.

DETAILED DESCRIPTION OF THE INVENTION

Figure 1:
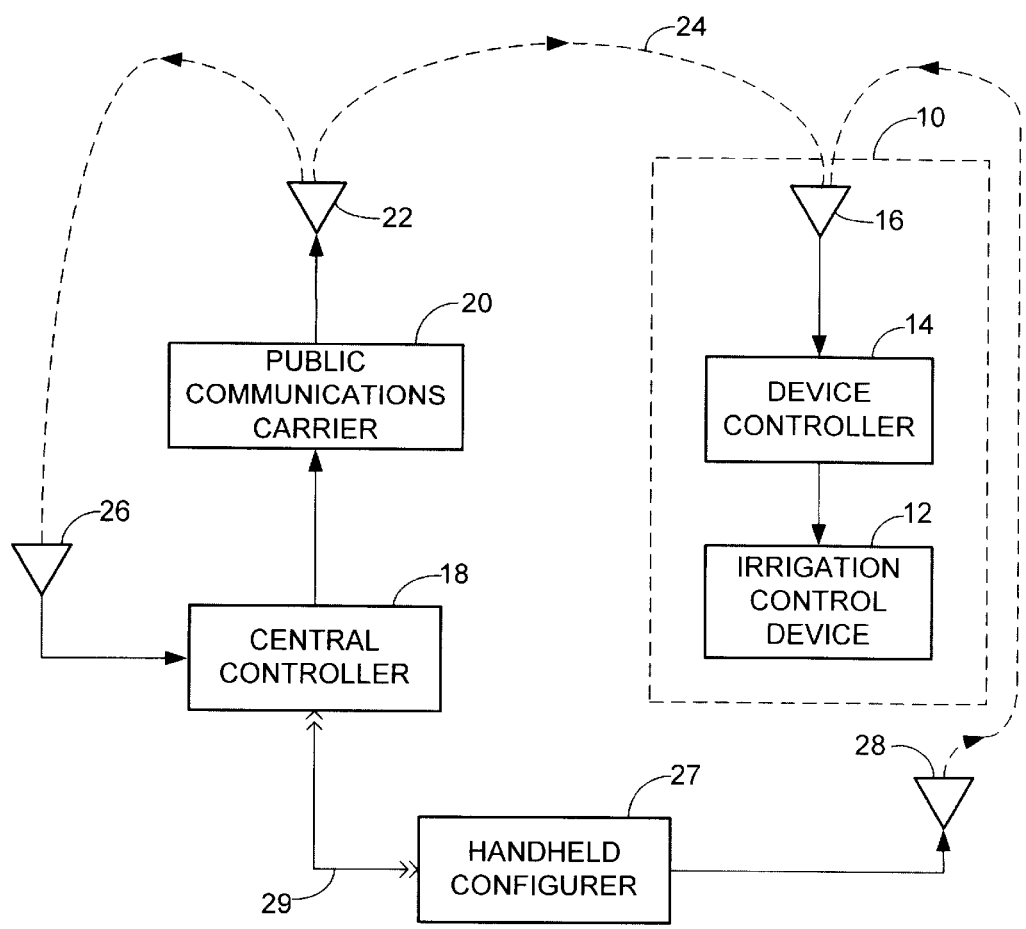
FIG. 1 is a block diagram showing the environment of the invention.

As shown in the drawings for purposes of illustration, the present invention pertains to a wireless irrigation controller that is completely self-contained and controllable from a central site by radio-frequency signals transmitted through a commercial communication network, such as a pager network. More specifically, as shown in FIG. 1 the wireless irrigation controller of the invention, shown generally by reference numeral 10, comprises a conventional irrigation control device 12, such as a valve, pump or rotor, a device controller 14, which will be described in more detail below, and a special-purpose antenna 16. A central controller 18, which may take various forms, generates control signals to be transmitted to the wireless controller 10. These signals are first transmitted to a public communications carrier 20, such as a pager service of the type used to transmit messages to portable pager units (not shown). These control signals are transmitted to a public communications carrier 20 using a dial-up modem protocol such as TAP or an internet protocol such as WCTP. The public communications carrier 20 may encode the signals in accordance with a standard pager communications protocol, such as FLEX®, and transmits them from an antenna 22. As indicated by the broken line 24, the signals are transmitted to the wireless controller antenna 16, either directly through the atmosphere or indirectly through one or more relay stations that receive and retransmit the signals. A local encoder/transmitter may be used in place of the public communications carrier 20.

Preferably, the central controller 18 also includes a verification receiver, indicated by antenna 26, which monitors signals transmitted from the antenna 22, to assure proper transmission of the signals to the wireless controller 10. The system also includes a handheld configurer 27, which is a portable device with its own antenna 28. The configurer 27 is a capable of performing multiple functions to configure, calibrate and manually control the device controller 14, by transmitting signals through the air to the controller receiver antenna 16. More specifically, the configurer 27 can be used to transmit an initial configuration to the device controller 10 when newly installed. The initial configuration includes a unique device address and an operating frequency. After installation of the device controller 10, the configurer 27 may be used to transmit calibration data to account for clock inaccuracies, to transmit or modify schedules of operation, and to manually turn the irrigation control device 12 on or off. The handheld configurer 27 may also be connected by a cable 29 to the central controller 18, to ensure that device operating schedules and other data stored in the configurer are synchronized with similar data stored in the central controller.

Figure 2:
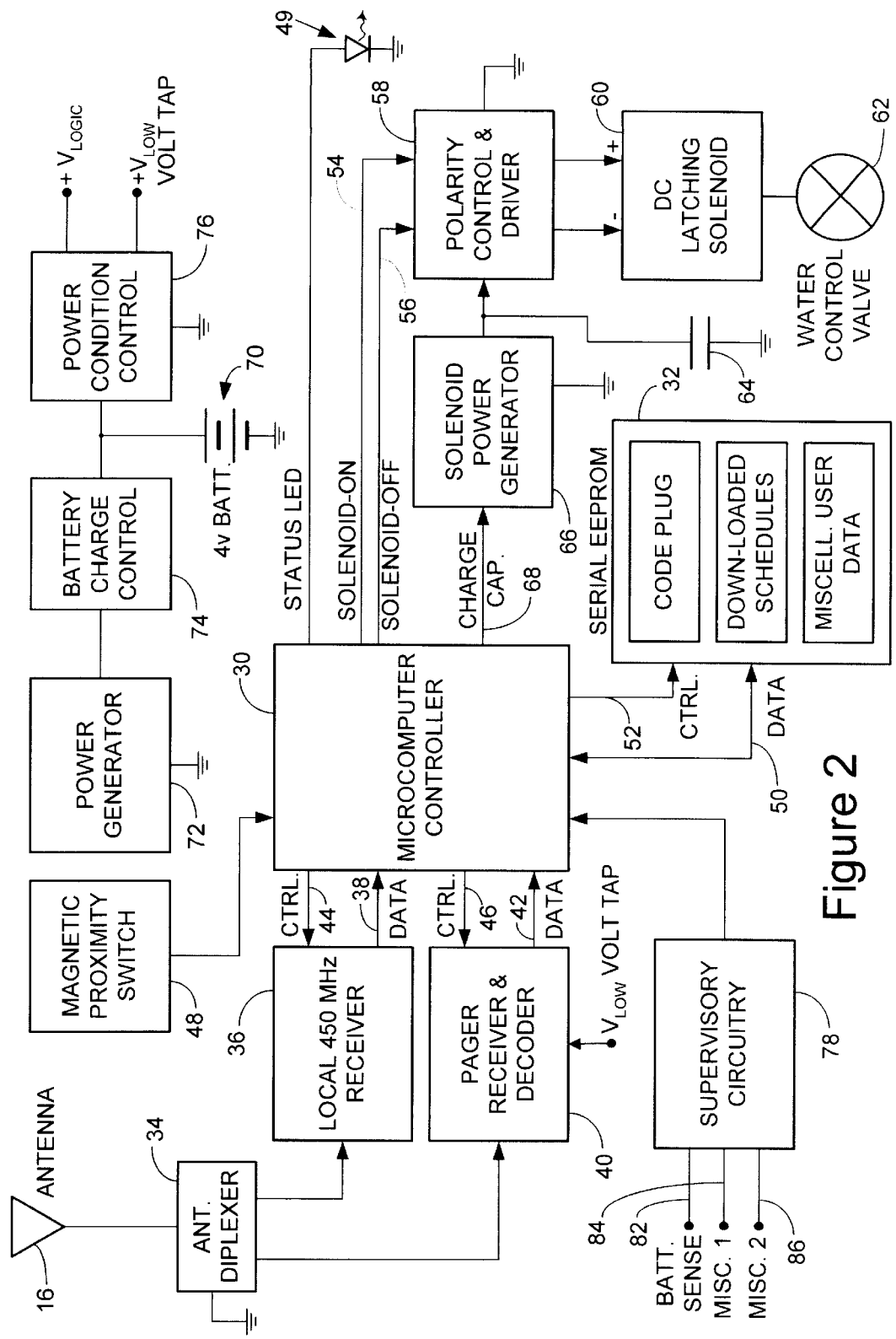
FIG. 2 is block diagram of a wireless controller in accordance with the present invention.

FIG. 2 depicts the principal components of the device controller 14. At the heart of the controller 14 is a microcomputer controller 30 and a memory module 32 in which are stored down-loaded watering schedules for the device 12, miscellaneous user data and microcomputer code. The microcomputer 30 may be, for example, the TLCS-870/C eight-bit microcontroller manufactured by Toshiba America Electronic Components, Inc. Signals from the antenna 16 are first processed by an antenna diplexer 34, which separates two types of received signals: those received from the public communications carrier 20, and locally transmitted signals at some convenient frequency, such as 450 MHz (megahertz). The latter signals are processed by a local receiver 36 and passed to the microcomputer 30 over line 38. These signals may be used to control the rotor 12 by means of the handheld configurer 27 carried by maintenance personnel near the device. Signals of the pager type are processed by a pager receiver and decoder 40 and passed to the microcomputer 30 over line 42. As indicated by lines 44 and 46, the microcomputer 30 sends control signals to the local receiver 36 and the pager receiver and decoder 40, respectively, to control operation of these components.

The microcomputer 30 has diagnostic processing to check the memories 32 and input and output interfaces. A magnetic proximity switch 48 operates to reset the microcomputer 30 and allows for operation in a secured configuration program sequence for a selected period of time after resetting. Therefore, the proximity switch 48 allows an operator to reset the controller 14 to the secured sequence, in the event of a controller malfunction. The microcomputer 30 also controls a light-emitting diode (LED) 49, which is used to indicate controller status and diagnostic information.

The data received through the antenna 16 may be watering schedules, changes in watering schedules, user data, or code corrections to be used by the microcomputer 30. The microcomputer 30 processes the incoming data and makes appropriate changes to the schedules stored in the memory module 32. Data are transmitted to and from the memory module 32 over line 50. Line 52 represents control signals transmitted to the memory module 32 from the microcomputer 30.

Based on the watering schedules stored in the memory module 32, the microcomputer 30 generates rotor valve ON and OFF signals on lines 54 and 56, respectively. These signals are coupled to a polarity control and driver unit 58, which, in turn, is coupled to a DC latching solenoid 60 that controls a water valve 62, if the controller 10 is used to control water flow through a pipe or in a rotor 12. If the controller 10 is used to control a pump, the solenoid 60 or an equivalent electrical relay, is used to actuate the pump. Operating power for the solenoid 60 comes from a capacitor 64, which is charged from a solenoid power generator 66, the latter being controlled by a charge-capacitor signal on line 68 from the microcomputer 30. The entire controller is powered by a 4-volt rechargeable battery 70. A power generation device 72, such as a solar array, provides recharging power to a battery charge control unit 74 connected to the battery 70. Power from the battery 70 is further conditioned in a power condition control unit 76, which provides voltage taps to power the controller and the solenoid power generator 66.

The controller also includes supervisory circuitry 78 that provides data to the microcomputer 30, over line 80, based on inputs on a battery sense line 82 and at least two other miscellaneous sense lines 84 and 86 that can be used for diagnostic or other purposes, according to a particular application of the controller.

Figure 3:
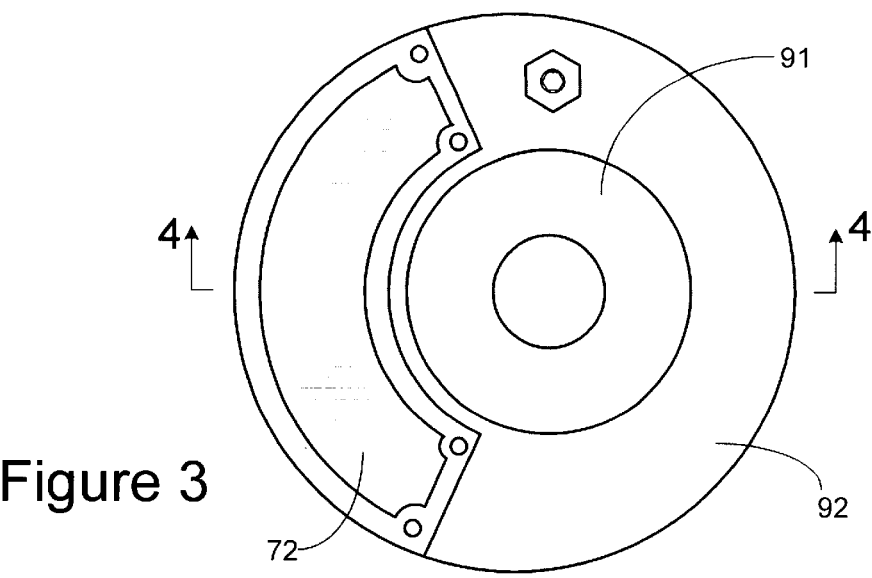
FIG. 3 is a simplified plan view of a wireless rotor in accordance with the invention.
Figure 4:
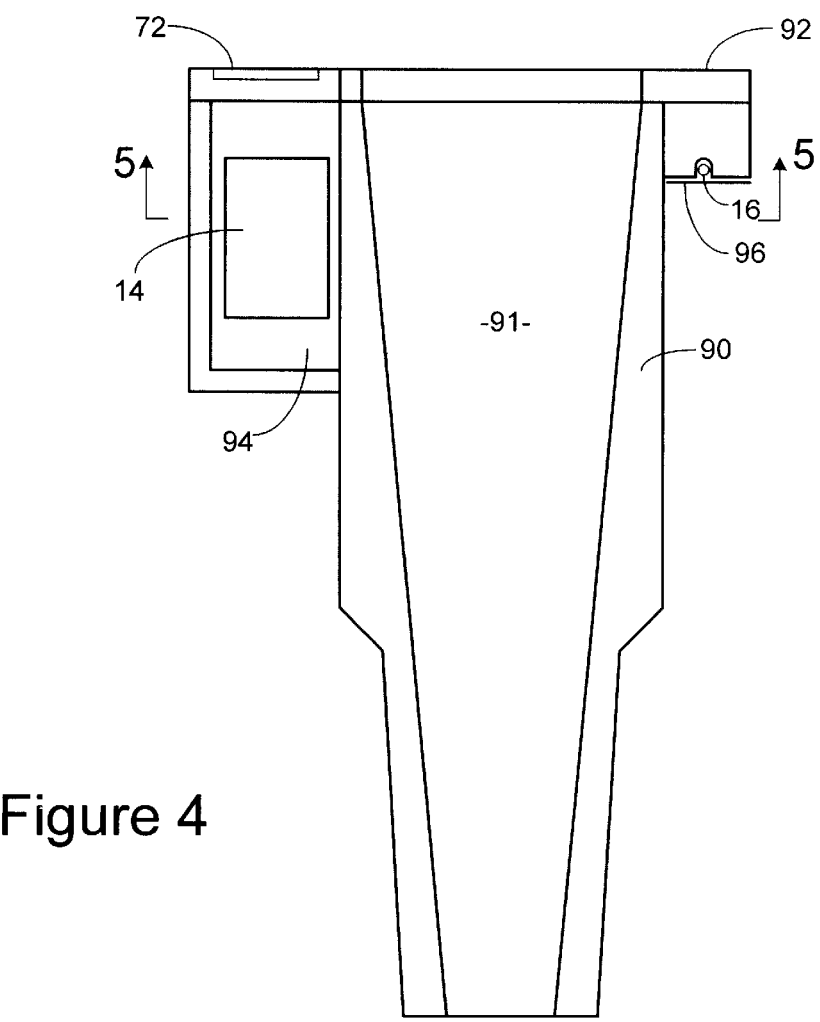
FIG. 4 is a simplified cross-sectional view of the wireless rotor of FIG. 3, taken generally along the line 4—4.
Figure 5:
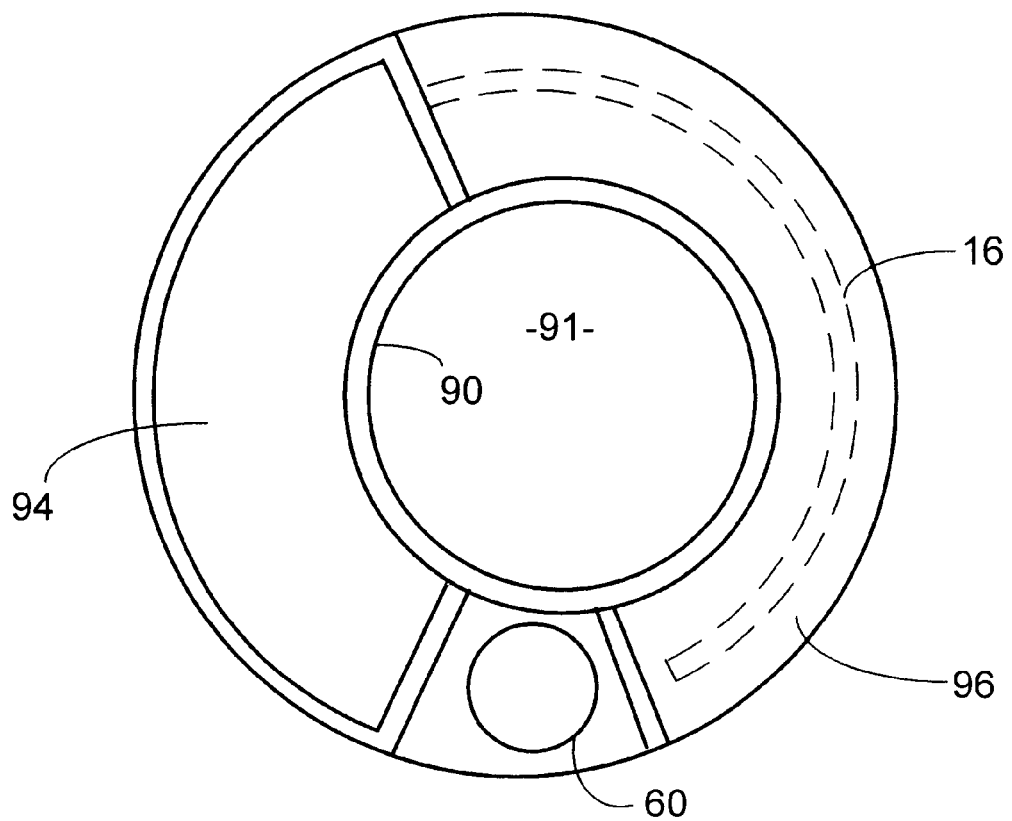
FIG. 5 is another simplified cross-sectional of the wireless rotor, taken generally along the line 5—5 of FIG. 4.

In accordance with one aspect of the invention as applied to irrigation rotors, the controller 14, including the power generator 72, in the form of a solar array, and the antenna 16, is enclosed in a conventional irrigation rotor. For example, the rotor may be a gear-driven rotor designated the EAGLE™ by Rain Bird Corporation Azusa, Calif., such as the EAGLE™ 700 Series, 750 Series, 900 Series or 950 Series, a detailed description of which may be obtained from the manufacturer's Web site located at www.rainbird.com. Alternatively, the rotor may be of the impact-arm type. FIGS. 3–5 are simplified views of a rotor body similar to the one used in the EAGLE™ gear-driven rotors. For clarity, the pop-up rotor mechanism itself is omitted from the drawings since it has little relevance to the present invention.

As shown in FIGS. 3 and 4, the rotor 12 has a hollow and generally cylindrical body 90, the interior of which forms a tapered cavity 91 that houses the gear-driven pop-up rotor head (not shown). Integral with the body 90 is a generally annular top 92. In most installations, the top 92 is the only portion of the rotor assembly that is visible above grade level. The lower end portion of the body 90 is coupled to an underground water supply pipe and includes a valve (62, not shown in FIG. 4). When the valve 62 is opened, the rotor head pops up above grade level and the gear-driven mechanism rotates a water jet slowly through a selected azimuth angle. The solar array 72 is installed as part of the top 92. More specifically, the solar array 72 is an annular segment of the top 92 and is recessed into the top in such a way as to present an unbroken, continuous upper surface. Immediately beneath the solar array 72 is a sealed cavity 94 that houses the remaining components of the rotor controller 14.

Another important aspect of the invention is the antenna 16. In the illustrative embodiment, the antenna 16 is an antenna installed beneath the portion of the top 94 that does not include the solar array 72. The position of the antenna 16 can be seen in FIG. 4, and in the upward-looking view of FIG. 5. Positioned immediately beneath the antenna 16 is a ground plane 96, which provides the desired antenna characteristics, such as the ability to operate at or slightly below grade level in a variety of environmental conditions that are typically adverse for antennas.

Communication protocols used between the central controller 18 and the public communications carrier 20, and between the public communications carrier 20 and the wireless rotor 10, are not critical to the invention. For convenience, the second protocol, between the carrier 20 and the wireless rotor 10, should preferably be an industry standard. For example, one of the FLEX® protocols originated by Motorola, Inc. is the industry standard one-way paging protocol in the United States. The protocol for communicating commands to the communications carrier 20 need only be selected to satisfy the requirements of the carrier. The central controller 18 may take the form of a conventional computer or a simpler communication device, or an on-site terminal and associated transmitter.

Communication of commands to the rotor 10 may use any convenient command format. Each rotor 10 will be identified by a unique code, which may be referred to as a passcode. For example, the passcode may be a three-digit numerical code ranging from 000 through 999 to accommodate a system with as many as 1,000 rotors. The command structure encompasses both simple commands and more complex commands, such as entire watering schedules. The simple commands may take the form <passcode><command>. For example, the following simple commands may be used:

<passcode>1 Turn rotor on immediately.

<passcode>0 Turn rotor off immediately.

<passcode>201<DDHHMMSS> Set time of day and day of week.

Other simple commands include unique command codes to: add a time adjustment, clear a watering table, clear one day of a watering table, resume watering from a watering table, suspend watering from a watering table, add and entry to a watering table, turn rotor on for a specified duration, and setting a real-time clock in the controller.

An inherent difficulty with remote wireless controllers is that there may be a delay or latency time associated with transmitting a control signal from the central controller 18 through the public communications carrier 20 to the various remote controllers. The verification receiver 26 (FIG. 1) allows the latency time to be measured. The central controller 18 can then transmit to the device controller 14 a time correction to compensate for the latency.

More complex data, such as an entire watering table, can be transmitted by first sending a simple command to condition the rotor to receive the data that follows. Conventional data formatting techniques may be employed, such as using special codes as delimiters to separate data records and to end the entire block of data.

Figure 6:
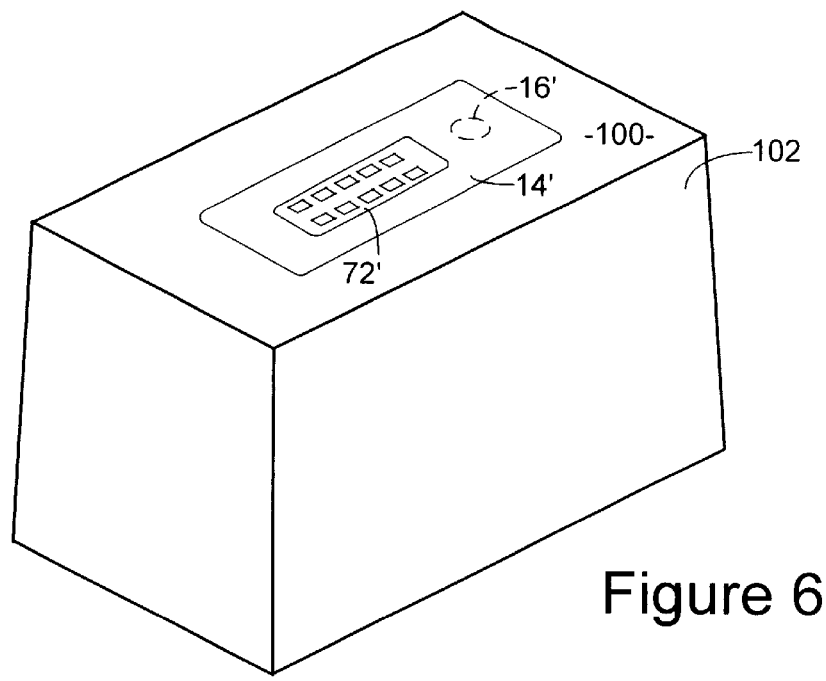
FIG. 6 is a simplified perspective view of a wireless controller in accordance with the invention, installed in a valve box.
Figure 7:
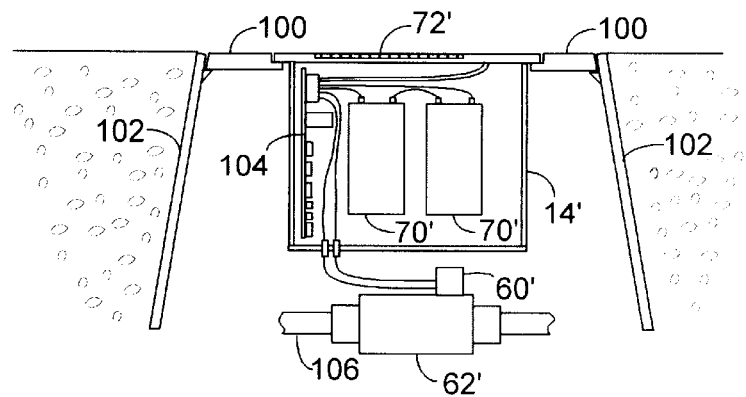
FIG. 7 is a simplified cross-sectional view of the wireless controller and valve box of FIG. 6, as installed in the ground.
Figure 8:
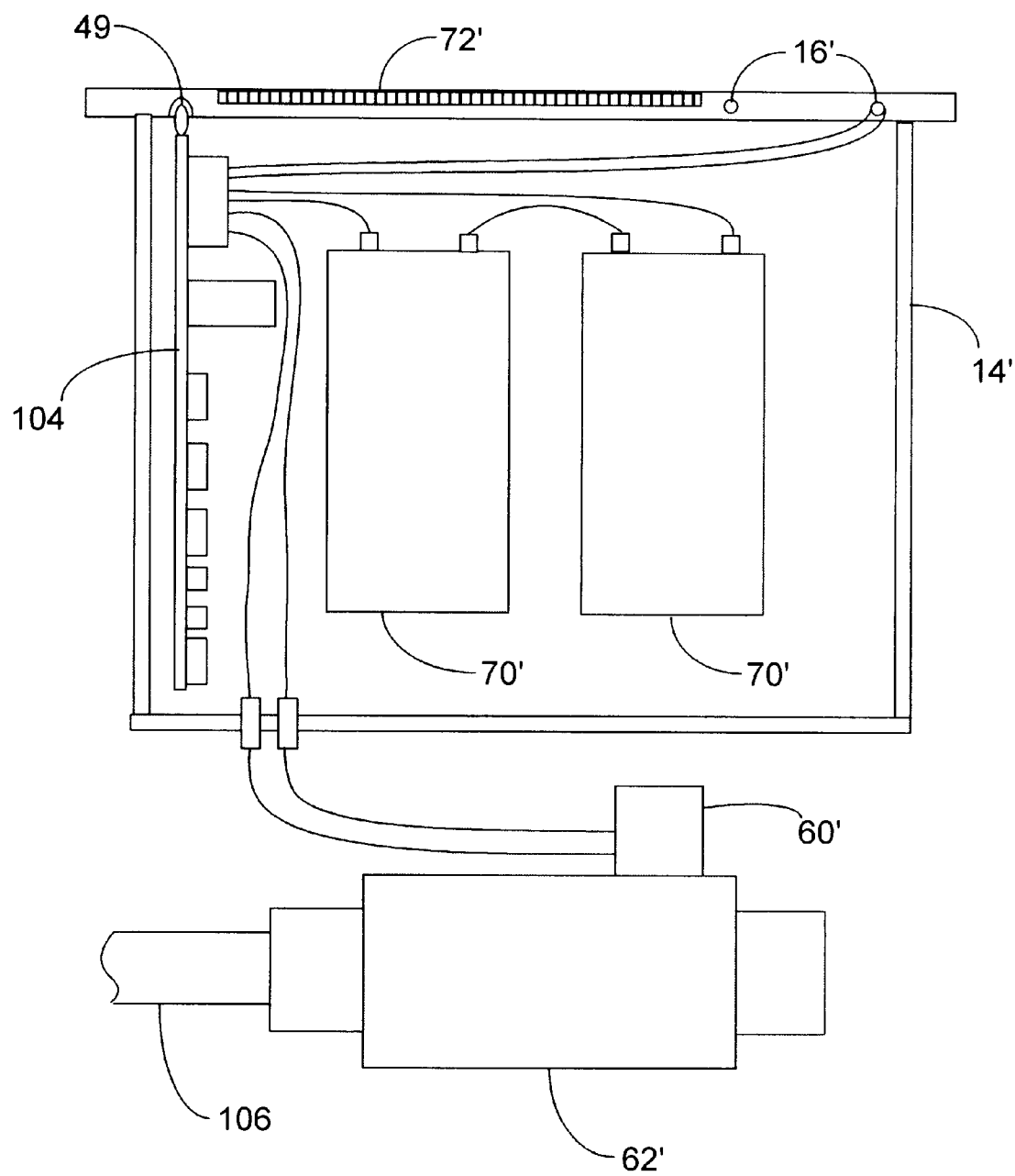
FIG. 8 is a more detailed cross-sectional view of the wireless controller of FIGS. 6 and 7, as installed in a valve box.

It will be readily understood that the foregoing discussion pertaining to wireless control of irrigation rotors also applies to the control of water valves not associated with rotors, and to the control of water pumps. For example, FIG. 6 shows an alternate form of a device controller 14' in accordance with the invention. The device controller 14' includes a solar panel 72' and an antenna 16', and is installed in a lid 100 of a valve box 102, as further illustrated in FIGS. 7 and 8. The controller 14' has all the components described in relation to the controller 14 of FIG. 2, most of which are installed on a circuit board 104. The antenna 16' is a conventional DDRR (directional discontinuity ring radiator) well known in the technical literature. The controller 14' is enclosed in a watertight housing, through which electrical connections are made to a solenoid 60' external to the housing. The solenoid is shown adjacent to a water valve 62' for controlling the flow of water through a pipe 106 beneath the valve box 102.

Figure 9:
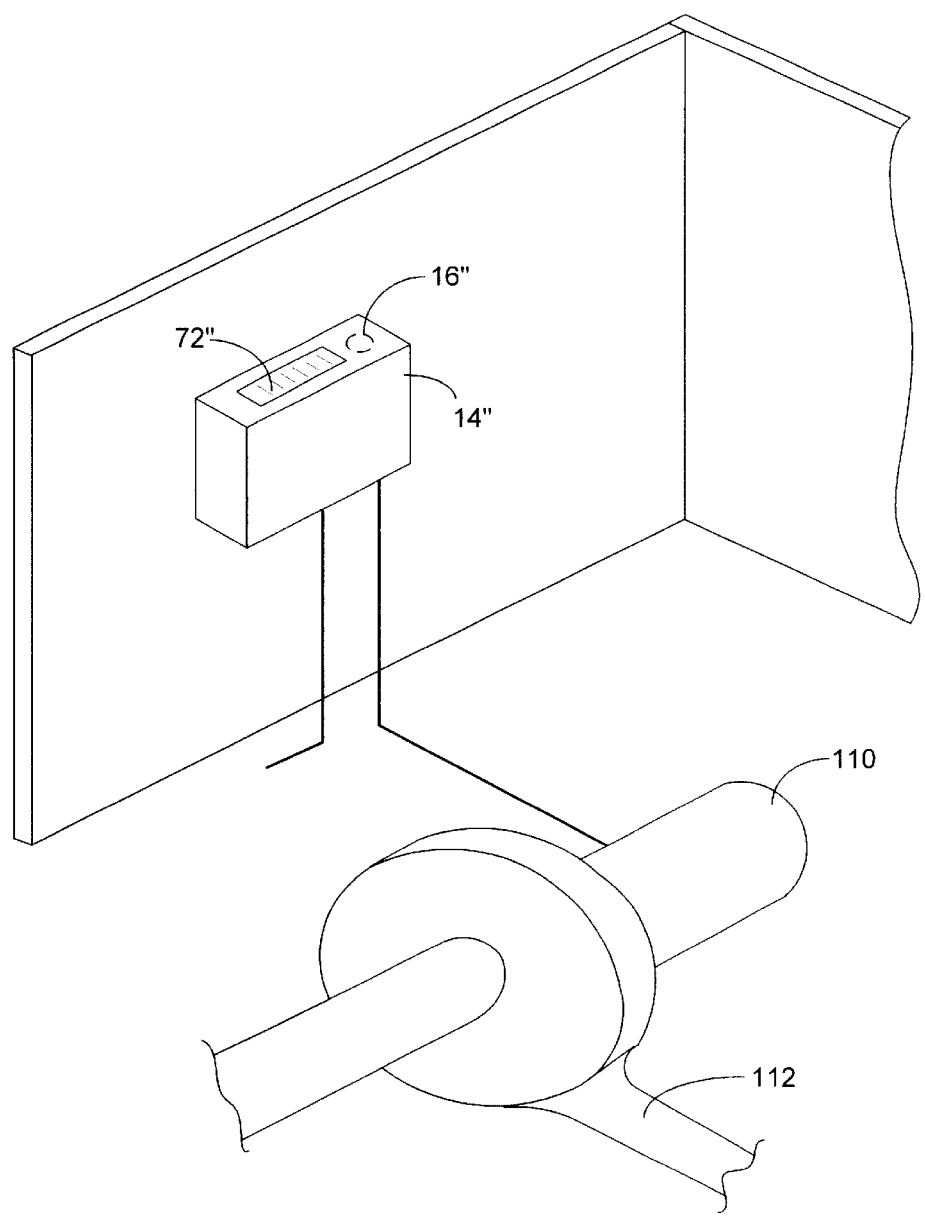
FIG. 9 is a simplified perspective view of a wireless controller in accordance with the invention, as installed to function as a wireless pump start relay.

FIG. 9 depicts a pump controller 14" similar to the controller 14' used for control of the valve 62'. The pump controller 14" includes all the components of the valve controller 14', including a solar panel 72" and DDRR antenna 16". In addition, the pump controller 14" includes a conventional electrical switch (not shown), which may be installed inside or outside the controller housing, and controls the flow of electrical power to a pump 110 coupled to a water pipe 112. The controller 14" controls the electrical switch, either directly or though a suitable relay, and thereby controls the flow of water through the pipe 112 to an irrigation site.

It will be appreciated from the foregoing that the present invention represents a significant advance in the field of irrigation control. In particular, the invention provides a wireless irrigation control device that can be conveniently controlled from a central location and has its own independent battery power supply including some type of power generator for recharging the battery. It will also be appreciated that, although specific embodiments of the invention have been illustrated and described in detail, various modifications may be made without departing from the spirit and scope of the invention. Accordingly, the invention should not be limited except as by the appended claims.

What is claimed:

1. A method for controlling a wireless irrigation control system having at least one wireless irrigation control device including a controller contained in a substantially sealed controller housing, and an antenna coupled to the controller and capable of receiving radio-frequency (RF) signals, and a rechargeable battery power supply contained in the housing to supply power to the controller and a water flow control device, the method comprising:

initializing the controller by means of a proximity switch contained within the housing;

recharging, as needed, the battery power supply using a battery charging generator;

broadcasting signals for reception by the initialized controller through the antenna;

decoding the broadcast signals received by the initialized controller and confirming that they apply to the particular irrigation control device associated with the initialized controller;

based on signals received through the antenna from time to time, and decoded in the preceding step, storing and updating at least one watering schedule in a memory module; and based on the stored watering schedule, generating signals to control a water flow control device in accordance with the watering schedule.

2. A method as defined in claim 1, wherein the step of generating signals to control a water flow control device are directed to a device selected from the group comprising: a rotor, a valve and a pump.

3. A method as defined in claim 1, and further comprising: configuring the controller by transmitting signals to it from a handheld transmitter.

4. A method as defined in claim 1, and further comprising: verifying that broadcast command signals have been transmitted to the wireless irrigation control device by receiving the same signals in a verification receiver.

5. A method as defined in claim 4, and further comprising: determining a transmission latency time from the verifying step; and transmitting a clock adjustment signal to the wireless irrigation control device, to compensate for the determined latency time.

6. A method as defined in claim 1, and further comprising: displaying a condition of the controller in a display device associated with the controller.

7. A method as defined in claim 6, wherein the step of displaying a condition includes displaying a condition selected from the group consisting of: battery condition, receiver status, and fault condition.

8. A method as defined in claim 1, wherein the battery charging generator includes an array of solar cells.

9. A method as defined in claim 1, wherein the proximity switch comprises a magnetic proximity switch.

10. A method as defined in claim 1 wherein the wireless irrigation control system includes a plurality of wireless irrigation control devices each including a controller contained in a substantially sealed controller housing, and an antenna coupled to the controller and capable of receiving radio-frequency (RF) signals, and wherein said broadcasting step comprises broadcasting signals applicable to more than one of said devices, each of said devices decoding the broadcast signals and confirming that they apply thereto.

11. A method as defined in claim 1 said broadcasting step comprises broadcasting signals from a central controller broadcast station.

12. A method as defined in claim 1 wherein said initializing step comprises actuating the proximity switch with a handheld configurer unit then sending configuration information from the handheld configurer unit.

13. A method for controlling a wireless irrigation control system having a plurality of wireless irrigation control devices each including a controller contained in a substantially sealed controller housing, an antenna coupled to the controller and capable of receiving radio-frequency (RF) signals, and a rechargeable battery power supply contained in the housing to supply power to the controller and a water flow control device, the method comprising:

initializing the controller of each of said wireless irrigation control devices by using a handheld configurer unit and actuating a magnetic proximity switch contained within the housing thereof;

recharging, as needed, the battery power supply using a battery charging generator;

broadcasting signals for reception by the antenna associated with the initialized controller of each of said wireless irrigation control devices, said signals being applicable to more than one of said wireless irrigation control devices;

decoding the broadcast signals received by the initialized controller of each of said wireless irrigation control devices and confirming that they apply to the particular irrigation control device associated therewith;

based on signals received through the antenna from time to time, and decoded in the preceding step, storing and updating at least one watering schedule in a memory module of the controller of each of said wireless irrigation control devices; and based on the stored watering schedule, generating signals to control a water flow control device associated with each of said wireless irrigation control devices, in accordance with the watering schedule.

14. A method as defined in claim 13, wherein the step of generating signals to control a water flow control device associated with each of said wireless irrigation control devices is directed to a device selected from the group comprising: a rotor, a valve and a pump.

15. A method as defined in claim 13, and further comprising configuring the controller by transmitting signals to it from the handheld unit.

16. A method as defined in claim 13, wherein the battery charging generator includes an array of solar cells.

17. A method as defined in claim 13 wherein said broadcasting step comprises broadcasting signals from a central broadcast station.

18. A wireless irrigation control system, comprising:
   at least one water flow control device;
   at least one wireless irrigation control device coupled to said water flow control device and including a controller mounted within a substantially sealed housing, an antenna capable of receiving radio-frequency (RF) signals, a configurable microcontroller contained within the housing and coupled to receive and process signals from the antenna, a memory module contained within the housing for storing watering schedules established or modified by wireless signals received through the antenna, and a proximity switch contained within the housing and configured to initialize the controller;
   a rechargeable battery power supply also contained within the housing, to supply power to the microcontroller and to the water flow control device;
   means for actuating said proximity switch for initializing said controller; and
   broadcast means for transmitting wireless signals for reception by the initialized controller through the antenna;
   said controller decoding the received broadcast signals received by the initialized controller and confirming that they apply to the particular irrigation control device associated therewith;
   said controller responding to the received broadcast signals for storing and updating at least one watering schedule in a memory module, and, based on the stored watering schedule, for generating signals to control said water flow control device in accordance with the watering schedule for reception by said antenna.

19. A wireless irrigation control system as defined in claim and further comprising a battery charge generator integrated into the controller housing and coupled to the battery power supply.

20. A wireless irrigation control system as defined in claim 19, wherein the battery charge generator includes an array of solar cells.

21. A wireless irrigation control system as defined in claim 18, and further wherein said proximity switch comprises a magnetic proximity switch installed in the controller housing and coupled to the microcontroller.

22. A wireless irrigation control system as defined in claim 21, wherein the magnetic proximity switch is configured to perform at least one function from the group consisting of: resetting the microcontroller, initiating a desired irrigation program sequence, and initiating a secured program sequence to allow system initialization.

23. A wireless irrigation control system as defined in claim 18, wherein the water flow control device is selected from the group consisting of a rotor, a valve and a pump.

24. A wireless irrigation control system as defined in claim 18, wherein the controller has RF reception capability to process both short-range signals transmitted from a location near the irrigation control device and longer-range signals transmitted through a broadcast system.

25. A wireless irrigation control system as defined in claim 24, wherein the controller receives short-range and longer-range RF signals through separate receivers operating in parallel at different frequencies.

26. A wireless irrigation control system as defined in claim 24, wherein the controller receives short-range and longer-range RF signals through a single receiver employing time-division multiplexing.

27. A wireless irrigation control system as defined in claim 18, wherein the microcontroller includes means for processing received signals indicative of real-time control commands directed to the water flow control device.

28. A wireless irrigation control system as defined in claim 27, wherein the means for processing received signals includes means for scheduling ON and OFF times for the water flow control device.

29. A wireless irrigation control system as defined in claim 27, wherein the means for processing received signals includes means for setting a real-time clock based on the received signals.

30. A wireless irrigation control system as defined in claim 29, wherein the means for setting a real-time clock makes adjustment for latency of transmission through a public broadcasting system.

31. A wireless irrigation control system as defined in claim 27, wherein the means for processing received signals includes means for adjusting irrigation control commands and sequences for the water flow control device.

32. A wireless irrigation control system as defined in claim 1, further including a visual status indicator coupled to the controller and integrated into the housing.

33. A wireless irrigation control system as defined in claim 32, wherein the visual status indicator is indicative of at least one of the conditions selected from the group comprising: battery condition, receipt of a control signal by the antenna, and a fault condition detected in the controller.

34. A wireless irrigation control system as defined in claim 18, wherein said at least one water flow control device comprises a plurality of water flow control devices, and further wherein said at least one wireless irrigation control device comprises a plurality of wireless irrigation control devices coupled respectively to said plurality of water flow control devices;
   each of said plurality of wireless irrigation control devices including a controller mounted within a substantially sealed housing, an antenna capable of receiving radio-frequency (RF) signals, a configurable microcontroller contained within the housing and coupled to receive and process signals from the antenna, a memory module contained within the housing for storing watering schedules established or modified by wireless signals received through the antenna, a proximity switch contained within the housing and configured to initialize the controller, and a rechargeable battery power supply also contained within the housing to supply power to the microcontroller and to the water flow control device associated therewith;
   said broadcast means for transmitting wireless signals applicable to more than one of said wireless irrigation control devices, and each of said wireless irrigation control devices decoding the received broadcast signals to confirm that they apply thereto.

35. A wireless irrigation control system as defined in claim 18 wherein said means for actuating said proximity switch comprises a handheld configurer unit.

36. A wireless irrigation control system as defined in claim 35 wherein said broadcast means comprises said handheld unit.

37. A wireless irrigation control system as defined in claim 36 wherein said broadcast means further comprises a central broadcast station.

38. A wireless irrigation control system as defined in claim 18 wherein said broadcast means comprises central broadcast station.

39. A wireless irrigation control system, comprising:

a plurality of water flow control devices;

a plurality of wireless irrigation control devices coupled respectively to each of said water flow control devices;

each of said wireless irrigation control devices including a controller mounted within a substantially sealed housing, an antenna capable of receiving radio-frequency (RF) signals, a configurable microcontroller contained within the housing and coupled to receive and process signals from the antenna, a memory module contained within the housing for storing watering schedules established or modified by wireless signals received through the antenna, a proximity switch contained within the housing and configured to initialize the controller; and a rechargeable battery power supply also contained within the housing to supply power to the microcontroller and to the water flow control device associated therewith;

means for actuating said proximity switch for initializing said controller of each of said wireless irrigation control devices; and broadcast means for transmitting wireless signals for reception by the initialized controller through the antenna of each of said wireless irrigation control devices, said wireless signals being applicable to more than one of said wireless irrigation control devices;

said controller of each of said wireless irrigation control devices decoding the received broadcast signals received by the initialized controller and confirming that they apply to the particular irrigation control device associated therewith;

said controller of each of said wireless irrigation control devices responding to the received broadcast signals for storing and updating at least one watering schedule in a memory module, and, based on the stored watering schedule, for generating signals to control said water flow control device associated therewith in accordance with the watering schedule for reception by said antenna.

40. A wireless irrigation control system as defined in claim 39 wherein said rechargeable battery power supply of each of said wireless irrigation control devices includes an array of solar cells.

41. A wireless irrigation control system as defined in claim 39, and further wherein said proximity switch of each of said wireless irrigation control devices comprises a magnetic proximity switch installed in the controller housing and coupled to the microcontroller associated therewith.

42. A wireless irrigation control system as defined in claim 39, wherein each of said water flow control devices is selected from the group consisting of a rotor, a valve and a pump.

43. A wireless irrigation control system as defined in claim 39 wherein said means for actuating said proximity switch of each of said wireless irrigation control devices comprises a handheld configurer unit.

44. A wireless irrigation control system as defined in claim 39 wherein said broadcast means comprises a handheld configurer unit.

45. A wireless irrigation control system as defined in claim 43 wherein said broadcast means further comprises a central broadcast station.

46. A wireless irrigation control system as defined in claim 39 wherein said broadcast means comprises central broadcast station.

* * * * *

UNITED STATES PATENT AND TRADEMARK OFFICE
CERTIFICATE OF CORRECTION

PATENT NO. : 6,782,310 B2
DATED : August 24, 2004
INVENTOR(S) : David F. Bailey et al.

It is certified that error appears in the above-identified patent and that said Letters Patent is hereby corrected as shown below:

Column 7,
Line 34, after "housing," delete "and";

Column 8,
Line 27, after "claim 1" insert -- wherein --; and

Column 9,
Line 45, after "claim" insert -- 18 --.

Signed and Sealed this

Twenty-eighth Day of June, 2005

JON W. DUDAS
*Director of the United States Patent and Trademark Office*